United States Patent
Vora

(10) Patent No.: US 10,367,839 B2
(45) Date of Patent: Jul. 30, 2019

(54) GRAPHICAL USER INTERFACE PROGRAMMED TO DISPLAY COMPLEX INDICATORS BASED ON STRUCTURED THREAT EXPRESSIONS

(71) Applicant: Cisco Technology, Inc., San Jose, CA (US)

(72) Inventor: Hiral Vora, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 193 days.

(21) Appl. No.: 15/581,376

(22) Filed: Apr. 28, 2017

(65) Prior Publication Data
US 2018/0314411 A1    Nov. 1, 2018

(51) Int. Cl.
*G06F 3/00*       (2006.01)
*H04L 29/06*    (2006.01)
(Continued)

(52) U.S. Cl.
CPC ........ *H04L 63/1425* (2013.01); *G06F 21/577* (2013.01); *H04L 41/22* (2013.01);
(Continued)

(58) Field of Classification Search
None
See application file for complete search history.

(56) References Cited

U.S. PATENT DOCUMENTS

| 2007/0222589 A1* | 9/2007 | Gorman | G06Q 10/00 340/539.26 |
| 2013/0326620 A1* | 12/2013 | Merza | H04L 63/1408 726/22 |

(Continued)

OTHER PUBLICATIONS

Sathish Alampalayam et al., Security in Internet of Things: Challenges Solutions and Future Directions, Jan. 1, 2016, IEEE, pp. 5772-5781 (Year: 2016).*

(Continued)

*Primary Examiner* — Tam T Tran
(74) *Attorney, Agent, or Firm* — Hickman Palermo Becker Bingham LLP

(57) ABSTRACT

Computer systems and methods for visualizing cybersecurity threat information are provided. A computer system comprises a display and processors coupled to the display and non-transitory computer-readable storage media coupled to the processors and storing data and sequences of instructions. Executing the instructions causes: retrieving, from the memory, the data that represents an expression comprising a plurality of observables; parsing the data to identify the plurality of observables, one or more Boolean operators, and one or more interdependencies between the observables, wherein an interdependency determines a logical relationship between two observables concatenated using a Boolean operator of the Boolean operators; generating a plurality of observation objects that corresponds to the plurality of observables; generating Boolean graphical objects that correspond to the Boolean operators; causing to present, on the display, the observation objects, contents included in the observation objects, and the Boolean graphical objects according to the interdependencies captured for the observables.

20 Claims, 12 Drawing Sheets

(51) Int. Cl.
*H04L 12/24* (2006.01)
*G06F 21/57* (2013.01)

(52) U.S. Cl.
CPC .......... *H04L 63/14* (2013.01); *H04L 63/1416* (2013.01); *H04L 63/20* (2013.01)

(56) References Cited

U.S. PATENT DOCUMENTS

2016/0036903 A1* 2/2016 Pal ..................... H04L 67/1004
709/213
2016/0103903 A1* 4/2016 Vivalda ............. G06F 17/30592
709/204
2017/0099304 A1* 4/2017 Anderson ........... H04L 63/1416

OTHER PUBLICATIONS

Reijo M. Savola et. al, Security—Measurability—Enhancing Mechanisms for a Distributed Adaptive Security Monitoring System, Jul. 1, 2010, IEEE, pp. 25-34 (Year: 2010).*

* cited by examiner

FIG. 2A

```
"observables":[            ← 202
{                          ← 204
"type":"observable",
"data":{                   ← 206
"type":"MD5",              ← 208
"value":"0123456789abcdef0123456789abcdef",}},
"equation":{               ← 210
"op":"AND",
"children":[
{},                        ← 212
"type":"observable",
"data":{                   ← 214
"type":"destinationSocketAddressIP",  ← 216
"value":"46.123.99.25",}},
"equation":{               ← 218
"op":"AND",
"children":[
{},                        ← 220
"type":"observable",
"data":{                   ← 222
"type":"SourceSocketAddressIP",  ← 224
"value":"46.123.99.26",}}],
```

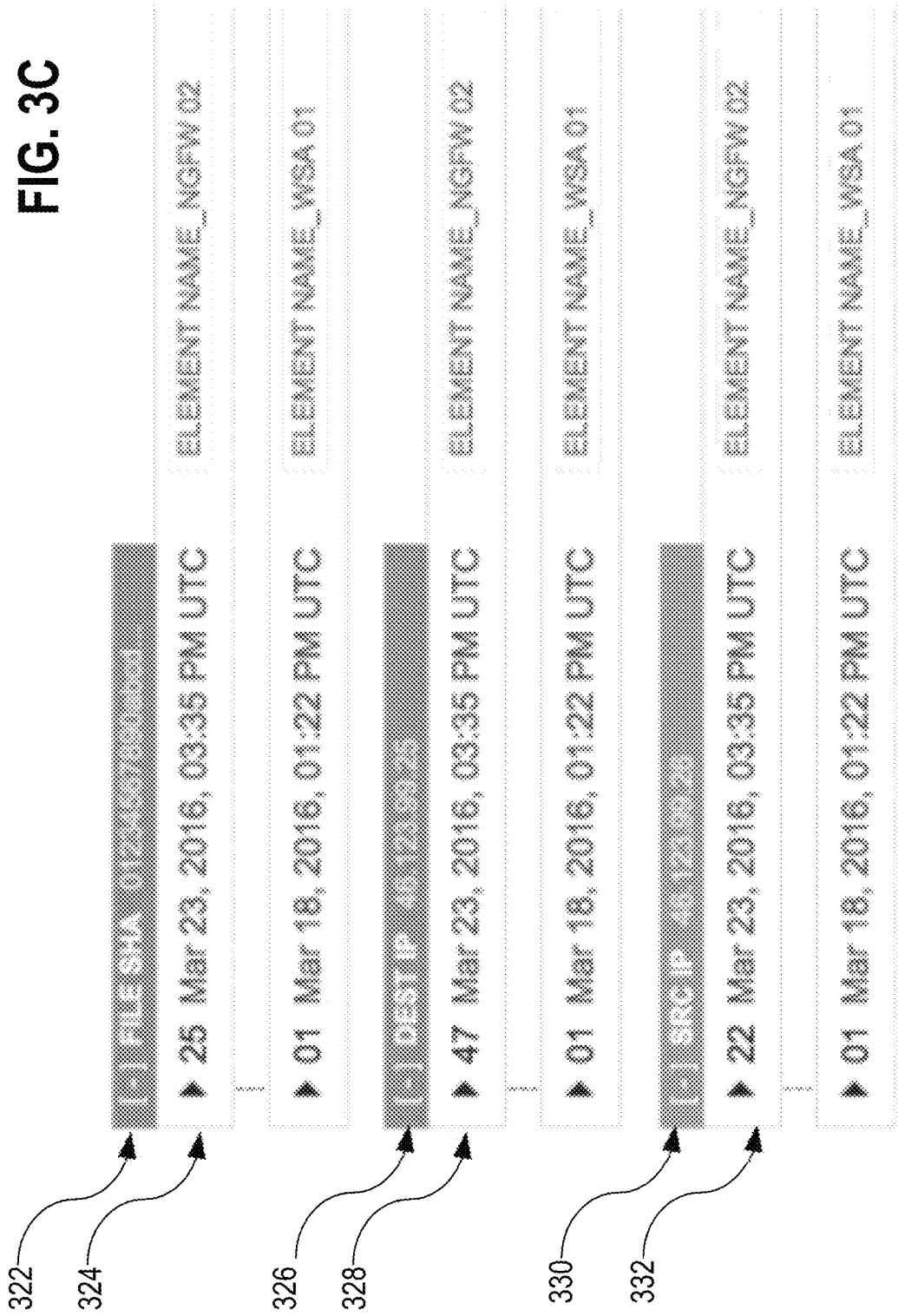

GRAPHICAL USER INTERFACE PROGRAMMED TO DISPLAY COMPLEX INDICATORS BASED ON STRUCTURED THREAT EXPRESSIONS

TECHNICAL FIELD

One technical field of the present disclosure is computer network security. Another technical field is graphical user interfaces that are useful in network security for visualizing structured threat information expression indicators in a graphical representation when the indicators include complex, hierarchical Boolean expressions. SUGGESTED GROUP ART UNIT: 2447; SUGGESTED CLASSIFICATION: 709.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Structured Threat Information eXpression (STIX) is a standardized XML programming language for encoding descriptions of cybersecurity threats that may be detected in computer networks. Typical expressions in the language include components called observables that may be concatenated using Boolean operators. If the expressions are complex and used to characterize complex threats, then machine processing, reading or understanding of the expressions becomes more difficult. As the complexity of the threats increases, so does the complexity of the STIX expressions, which may be difficult to parse as they may include multi-level and convoluted logical interdependencies.

Another issue is scalability of the STIX expressions. Processing and interpreting the STIX expressions using the amount of computing power that is typically available may be quite challenging especially when the count of observables increases to hundreds or thousands. Interpreting complex STIX expressions may be often challenging and time consuming.

SUMMARY

The appended claims may serve as a summary of the approach.

BRIEF DESCRIPTION OF THE DRAWINGS

In the drawings:

FIG. 2A and FIG. 2B depict example expressions representing information capturing cybersecurity threats according to various embodiments.

FIG. 3A, FIG. 3B, FIG. 3C, FIG. 3D, FIG. 3E, and FIG. 3F depict aspects of an example interface for displaying expressions representing information capturing cybersecurity threats in various embodiments.

Figure 1:
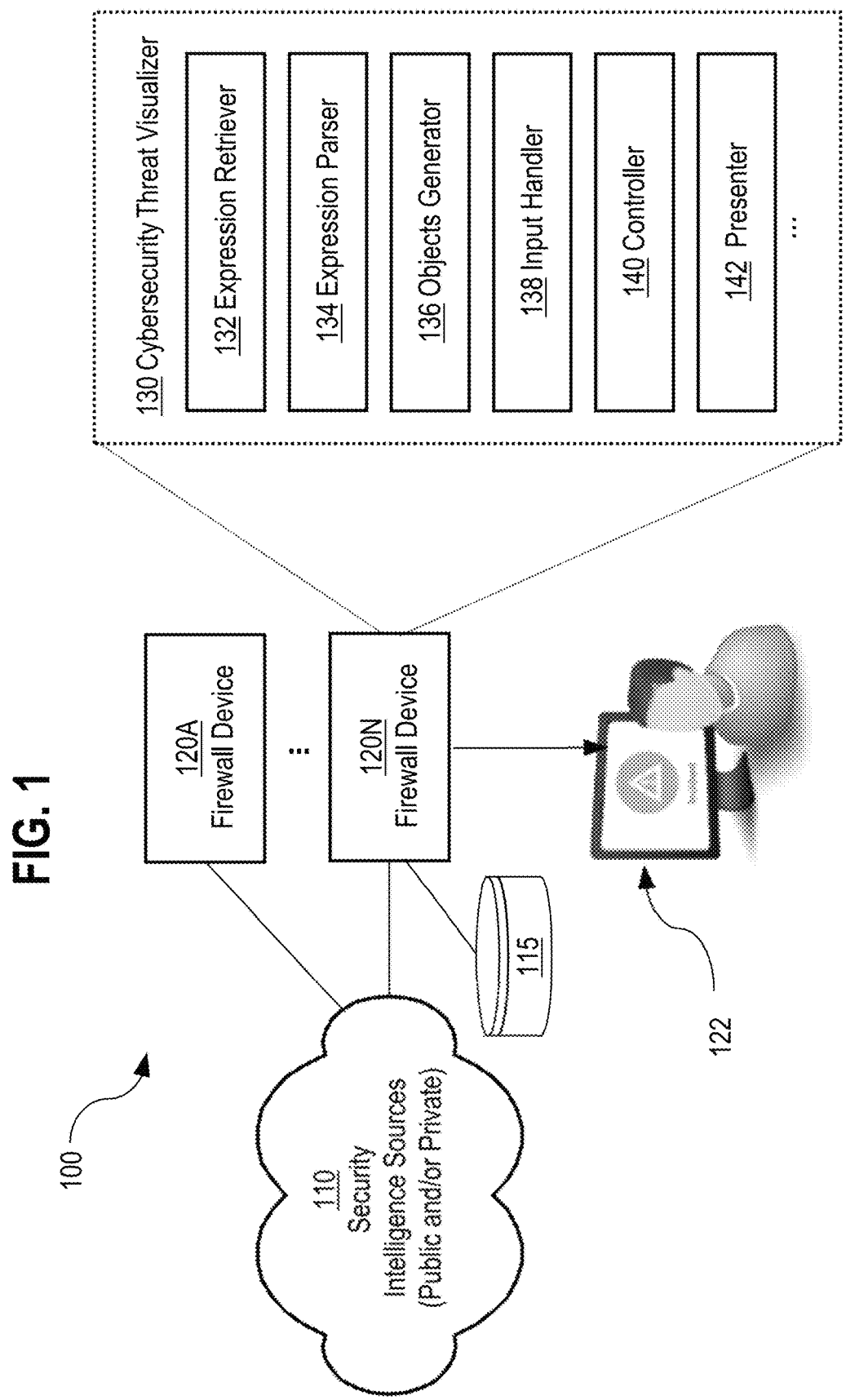
FIG. 1 depicts a block diagram of a computer system for visualizing cybersecurity threat information in an example embodiment.

While each of the drawing figures illustrates a particular embodiment for purposes of illustrating a clear example, other embodiments may omit, add to, reorder, or modify any of the elements shown in the drawing figures. For purposes of illustrating clear examples, one or more figures may be described with reference to one or more other figures, but using the particular arrangement illustrated in the one or more other figures is not required in other embodiments. For example, firewall devices 120A, 120N, database 115, and security intelligence sources 110 in FIG. 1 may be described with reference to several steps in FIG. 4A and FIG. 4B discussed in detail below. However, using the particular arrangement illustrated in FIG. 1 is not required in other embodiments.

DETAILED DESCRIPTION

In the following description, for the purposes of explanation, numerous specific details are set forth in order to provide a thorough understanding of the present approach. It will be apparent, however, that the present approach may be practiced without these specific details. In other instances, well-known structures and devices are shown in block diagram form in order to avoid unnecessarily obscuring the present approach. Furthermore, words, such as "or" may be inclusive or exclusive unless expressly stated otherwise.

Embodiments are described herein according to the following outline:

1.0 General Overview
   2.0 Example Computer System for Visualizing Cybersecurity Threat Information
   3.0 Example Threat Observables
   4.0 Example Graphical Objects Generated for Threat Observables
   5.0 Example Process for Visualizing Expressions Representing Cybersecurity Threat Information
   6.0 Benefits of the Embodiments
   7.0 Implementation Mechanisms—Hardware Overview
   8.0 Other Aspects of Disclosure

1.0 General Overview

In various embodiments, a computer system and computer-implemented methods are provided for generating an interface for computer display for visualizing STIX expressions that represent cybersecurity threat information. Methods may be implemented in security devices such as firewalls and may be configured to receive and parse STIX expressions that include a plurality of STIX observables connected with each other using Boolean operators. The parsed STIX expressions may be visualized on a computer display in a graphical user interface. "Visualization," in this context, refers to digital machine-generated displays of STIX expression data that has been transformed to present the data in a more concise and efficient manner. The visualization may be enhanced in response to computer input by providing and displaying additional information about the detected threats. The additional information may include event data that is associated with the detected threats and that is retrieved from event logs or other sources accessible to the firewalls.

STIX observables represent stateful properties or measurable events pertinent to operations that are performed by computers and computer networks. The observables include event data associated with threat incidents and may comprise observable instances and observable patterns.

Observable instances may characterize objects such as files, email messages, network connections, or network addresses. Observable patterns may characterize properties of a single instance object including a file name or a file size. Observable patterns may be used to characterize common properties of one or more objects. For example, an observable pattern may be used to define a logical AND relationship across many property value patterns specified for many objects.

Observable patterns may be represented using indicators. Indicators may be used to convey specific observable patters combined with contextual information representing artifacts and suspicious events occurring in a computer network. The indicators may capture various observable patterns mapped onto a related context. They may correspond to structural representations of expressions that use logical AND operators and OR operators. The indicators may be published within the computer network environment along with related observable instances.

Embodiments may generate an interface that depicts interrelations between the STIX observables in a clear way. The interface may be configured to present the hierarchy of the relationships between the observables in a more concise and efficient yet still accurate form. The interface may be implemented as a graphical user interface, and may initially display only the most relevant information. If additional or detail information is needed, then the interface may be modified and the displayed information may be expanded and enhanced.

An interface may be programmed to provide interactivity between user computers and the interface. For example, graphical objects displayed in the interface may be selectable, and upon their selection, detail information may be obtained and displayed. Furthermore, upon selecting certain objects, additional information related to the cybersecurity threat may be collected or retrieved, and displayed in the interface to enhance the already displayed data.

An interface may be configured to display complex Boolean expressions in a communicative manner. For example, the initially displayed interface may depict the information that is the most relevant and captures the highest level of the interrelations between observables. The relevant information may include the observables that describe types of cybersecurity threats, destination addresses of network devices that are affected by the threats and source addresses of network devices that initiated the threats. The non-relevant information may be hidden from the initial view, but still available for displaying if needed. The initially displayed interface allows understanding the information about a threat quickly and without an in-depth analysis of the corresponding expression. It may capture the correlations between various observables and convey the character of the threat in an intuitive manner. If needed, the initially displayed interface may be modified to include additional information about the threat. The modification may be performed upon a request or upon receiving a selection of certain objects already displayed in the interface.

An interface may be used to visualize additional information related to observables and relationships between the observables. For example, upon receiving a selection of a particular object representing a particular observable, additional information about the particular observable may be retrieved from event logs maintained by firewalls, and displayed in the interface.

An interface may be used to visualize observables and logical relationships between the observables using color schemes. The observables and Boolean operators may be color coded according to any type of color scheme that allows distinguishing the depicted objects. The color schemes may be customized to various levels of the hierarchy of the relationships, various types of observables, and various types of Boolean operators.

An interface may be configured with a scrollbar for scrolling up and down the displayed information. Using the scrollbar does not change relationships between depicted observables, but allows focusing on items that are relevant and adjusting the display as needed.

An interface may be expandable to accommodate displaying cybersecurity threat information even when the count of detected threats increases to hundreds or thousands.

In an embodiment, a computer system for visualizing cybersecurity threat information is provided. The threat information may be provided by a computer network with a plurality of computing devices. The computer system for visualizing the threat information comprises a display, one or more processors, and one or more non-transitory computer-readable storage media storing both instructions and data that represents STIX expressions. The one or more processors execute the instructions to cause the processors to retrieve, from the storage media, the data that represents an expression comprising a plurality of observables. An observable, of the plurality of observables, comprises at least one type indicator and at least one value. A type indicator may indicate a type of a value included in the observable.

The retrieved data is parsed to identify a plurality of observables, one or more Boolean operators, and one or more interdependencies between the observables. An interdependency determines a logical relationship between two observables of the plurality of observables that are concatenated using a Boolean operator of the two or more Boolean operators.

A plurality of observation objects is generated. The plurality of observation objects corresponds to the plurality of observables. An observation object of the plurality of observation objects corresponds to a respective observable of the plurality of observables, and stores information included in the respective observable.

One or more Boolean graphical objects are generated. The Boolean graphical objects correspond to the one or more Boolean operators. Thus, if two observables, of the plurality of observables, are concatenated using a particular Boolean operator, then a particular Boolean graphical object is generated to represent the Boolean operator, and the Boolean graphical object will be used to concatenate two observation objects generated for the two observables.

In an embodiment, the display has at least two display regions. One region is referred to as an expression visualizer portion, and another region is referred to as an incident detail visualizer portion, or just an incident detail portion. The following may be displayed in the expression visualizer portion of the display: the plurality of observation objects, contents included in the plurality of observations objects, and the Boolean graphical objects connecting the observation objects. The displayed objects are displayed according to the interdependencies determined for the observables.

The displayed objects may be implemented with interactivity capabilities. For example, certain objects may be selectable, and upon their selection, requests are generated to indicate the received input and the selection.

In an embodiment, first input is received. The first input may indicate a selection of a first observation object of the plurality of observation objects. The first observation object may correspond to a first observable of the plurality of observables. In response to receiving the first input, a first type indicator and a first value associated with the first observable are determined. Based on the first type indicator and the first value, an event information of a first event captured by the first observable is determined. The event information may be displayed in the incident detail portion of the display.

In addition to displaying the event information, additional information about the first event may be displayed in the display. The additional information may be retrieved from event logs maintained by firewalls. The event logs may store log records containing information about data traffic transmitted to and from firewall devices. A log record may comprise a date of an event, a time of the event, a firewall identifier of a firewall on which the event occurred, a network identifier of a network in which the event occurred, a port identifier of a port on which the event occurred, and/or a count of users who were impacted by the event. The event logs may be scanned and analyzed to determine whether the logs include event records related or corresponding to the first event. If a match is found, then the log records corresponding to the first event are extracted from the event logs, and displayed in the incident detail portion of the display.

In an embodiment, second input is received. The second input indicates a request to scroll the information displayed in the incident detail portion of the display. In response to receiving the second input, scrolled information is generated based on the displayed information, and displayed in the incident detail portion of the display.

In an embodiment, the display includes an information banner portion for displaying for example, some additional information associated with a threat event. The additional information may include for example, a count of observations related to the threat event, a confidence level indicating that the threat is in progress, an action, an event category, and/or the threat status.

In an embodiment, a method for visualizing cybersecurity threat information provided by a computer network with a plurality of computing devices is presented. The method may comprise the steps that are implemented in the system described above.

In an embodiment, a non-transitory computer-readable storage medium storing one or more instructions which, when executed by one or more hardware processors, cause the one or more hardware processor to perform the method described above is presented.

A "computer" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, routers, hubs, switches, desktop computers, laptop computers, mobile devices, or any other special-purpose computing devices. Any reference to "a computer" herein may mean one or more computers, unless expressly stated otherwise. Further, for purposes of illustrating a clear example, a limited number of elements are shown in FIG. 1 but other embodiments may use any number of network devices or computers.

A "set" may comprise one or more items. For example, a set of computers may be one or more computer.

Causing to present a graphical element, such as a node, edge, graph, or other user interface element, may comprise updating one or more frame buffers in one or more processors, and instruct the one or more processors to present the graphical element on a display.

2.0 Example Computer System for Visualizing Cybersecurity Threat Information

In an embodiment, a computer system for visualizing cybersecurity threat information is implemented comprises a firewall device that operates under program control to implement the methods, processes and algorithms that are further described herein in other sections. The firewall receives cybersecurity threat information from one or more computer sources in the form of STIX expressions. The firewall is configured to parse the received information, identify in the parsed information observable and relationships between the observables, and generate and display a visual representation of the parsed information using the techniques herein.

FIG. 1 depicts a block diagram of a computer system 100 for visualizing cybersecurity threat information in an example embodiment. Computer system 100 may include one or more firewall devices 120A, 120N, and may receive information from various security intelligence sources 110.

Security intelligence sources 110 may include public and private network devices configured to detect cybersecurity threats and collect information describing the threats. Sources 110 may include specialized servers, security agents and sensors. Sources 110 may be configured to encode the threat information using for example, STIX expressions, and transmit the encoded information to firewall devices 120A, 120N.

Firewall devices 120A, 120N may be configured to receive threat information from security intelligence sources 110, process and enhance the received information, generate visual representations of the information, and display the visual representations on display devices, such as a display 122. Firewall devices 120A, 120N may also maintain one or more event logs that contain event records for events occurring in system 100. The event logs may be stored in one or more databases 115.

A client device 120N, as well client device 120A, may include display 122, one or more processors (not depicted in FIG. 1), and one or more memory units or other non-transitory digital data storage media such as disk (not depicted in FIG. 1) for storing instructions and data. The instructions stored in the client device 120N may implement a cybersecurity threat visualizer 130. The data represents expressions that capture information about cybersecurity threats. The expressions may be STIX expressions.

Visualizer 130 may implement an expression retriever 132, an expression parser 134, an object generator 136, an input handler 138, a controller 140, and a presenter 142. Configurations of visualizer 130 may vary and some of the visualizers may include some of the components depicted in FIG. 1, and/or additional components not shown in FIG. 1. In an embodiment, each of the components of visualizer 130 comprises a set of computer executable instructions that are programmed as described herein for the functions that pertain to the associated components.

Expression retriever 132 is configured to retrieve threat expressions from storage of firewall device 120N or from security intelligence sources 110. For example, expression retriever 132 may retrieve, from the storage of firewall device 120N, data that represents a STIX expression comprising a plurality of observables.

Expression parser 134 is programmed in one embodiment parse the expression data to identify a plurality of observables, one or more Boolean operators that connect the observables, and interrelationships between the observables.

Parsing STIX expressions may be performed in a variety of ways. Regular expressions may be parsed by identifying keywords and matching patterns. Regular expressions are string patterns that describe textual contents. The expressions may include classes, quantifiers and meta-characters. Parsing the regular expressions may include scanning the expressions and searching for the identifiers of classes, quantifiers and their delimiters, and the meta-characters. For example, an expression may be parsed to identify in the expression one or more identifiers of character classes that are used to define the content of the patterns, identify quantifiers that are used to specify the number or length that part of a pattern should match or repeat, and identifying meta-characters that are used to group, divide and perform special operators in patterns. Non-limiting examples of expressions are described in FIG. 2A and FIG. 2B. Character classes may be interpreted as observables and Boolean operators.

If two observables, of the plurality of observables in the expression data, are concatenated using a Boolean operator of the one or more Boolean operators, then expression parser 134 identifies the observables, the Boolean operator, and the relationship defined by the Boolean operator with respect to the observables. An observable, of the plurality of observables, may include at least one type indicator and at least one value. A type indicator indicates a type of a value included in the observable. Non-limiting examples of the types of observable include observable, MD5 hashing function identifier, DestinationSocketAddress IP, and SourceSocketAddress IP. Non-limiting examples of the values include alphanumerical strings representing hashed threat information, alphanumerical strings representing IP addresses, and alphanumerical strings representing relationships between observables.

Object generator 136 is configured to generate data objects. For example, object generator 136 may generate a plurality of observation objects that corresponds to the plurality of observables. An observation object of the plurality of observation objects generated by object generator 136 corresponds to a respective observable, of the plurality of observables identified in the expression data. The observation object may store information included in the respective observable.

Object generator 136 may also generate one or more Boolean graphical objects that correspond to the one or more Boolean operators identified in the expression data.

Input handler 138 is configured to handle interactive aspects of the visualizer. For example, input handler 138 may receive user inputs, including first input, second input, and third input. The first input may indicate a selection of a first observation object of the plurality of observation objects. The first observation object may correspond to a first observable of the plurality of observables. In response to receiving the first input, input handler 138 determines a first type indicator and a first value associated with the first observable. Based on the first type indicator and the first value, input handler 138 determines a first event that is encoded in the first observable.

Input handler 138 may receive second input indicating a request to scroll information displayed in display 122. In response to receiving the second input, input handler 138 generates a request for obtaining scrolled information and displaying the scrolled information in display 122, and communicates the request to controller 140.

Controller 140 is configured to manage observables, observation objects, Boolean objects, event logs, and various types of information that is associated with the objects. For example, controller 140 may generate requests to display the observation objects, Boolean graphical objects and interrelations between the objects, and transmit the requests to presenter 142.

Controller 140 may also manage and access event logs. The event logs may be maintained by firewall devices 120A, 120N, and may be used to store log records containing information about data traffic transmitted to and from the firewalls. A log record includes one or more of: a date of an event, a time of the event, a firewall identifier of a firewall on which the event occurred, a network identifier of a network in which the event occurred, a port identifier of a device port on which the event occurred, or a count of users who were impacted by the event. The event log may be stored in database 115 that is accessible to firewall devices 120A, 120N.

Controller 140 may scan and analyze the event logs to determine whether the logs contain any log record associated or corresponding to an event that has been identified from the expression data. If a match is found and a particular log record is identified in the logs, then controller 140 retrieves the particular log record from the event logs, and communicates the retrieved information to presenter 142.

Controller 140 may also be configured to determine and retrieve additional information associated with threat events. The additional information may include one or more of: a count of observations, a confidence level, an action, or an event category, or a threat status. Once the additional information is determined, controller 140 transmits the additional information to presenter 142 along with a request to display the additional information in display 122.

Display 122 may include one or more display regions. The manner in which the regions are defined may vary. In one implementation, display 122 is divided to at least three regions, which include an equation visualizer portion, an incident detail visualizer portion, and an information banner portion. The display portions may be adjustable and reconfigurable. The portions may also be color coded according to various color schemes and styles.

Presenter 142 is configured to generate visual representations of objects and information, and cause displaying the visual representations on display 122. For example, presenter 142 may generate a visual representation of objects generated based on expression data and a visual representation of information associated with the objects, and display the visual representations in various portions of display 122.

Presenter 142 may also receive requests for displaying additional information. Upon receiving such a request and the additional information, presenter 142 generates a visual representation of the additional information, and displays the visual representation of the additional information in display 122.

Presenter 142 may also receive requests for scrolling contents already displayed in display 122. Upon receiving such a request and one or more scrolling parameters describing the manner in which the scrolling is to be performed, presenter 142 generates the scrolled information based on the already displayed information and the scroll parameters. Then, presenter 142 displays the scrolled information in display 122.

3.0 Example Threat Observables

Information about cybersecurity threats may be represented using STIX expressions stored in a STIX file and communicated from security intelligence sources 110 to firewall devices 120A, 120N.

A STIX file may include complex Boolean expressions and collections of data. The expressions may include observables that are connected with each other according to hierarchical Boolean relationships. Some of the relationships may be multi-components and multi-nested. Embodiments are programmed for parsing even the most complex STIX expressions, and/or transmitted to other computers for further processing.

Figure 2B:
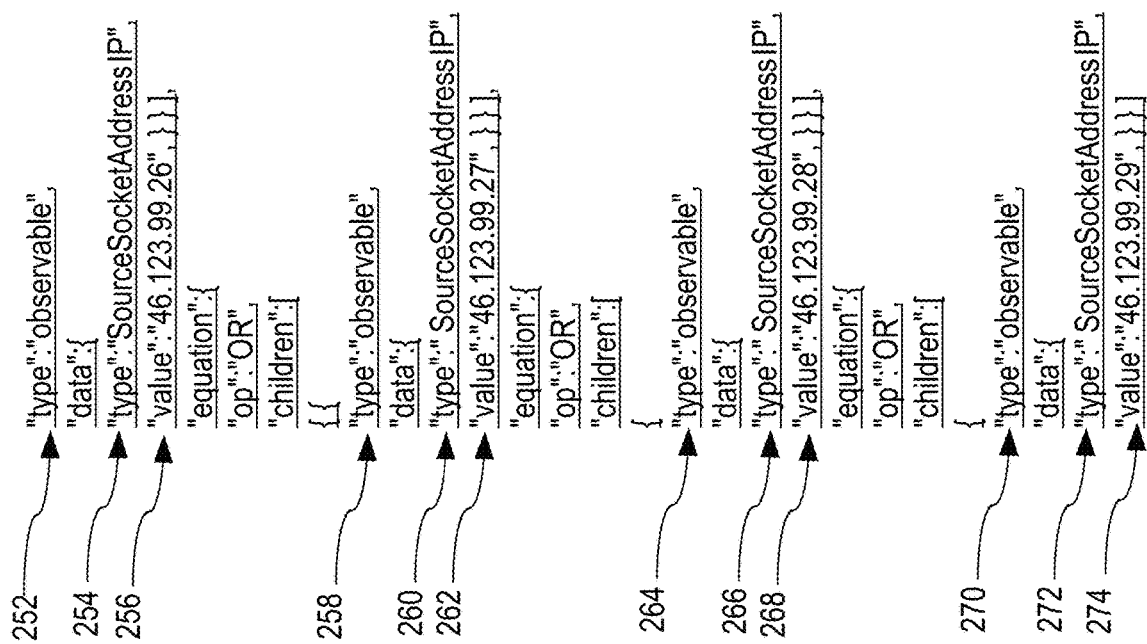

FIG. 2A and FIG. 2B each depicts an example expression representing information capturing cybersecurity threats according to an example embodiment. The depicted expressions have been generated for a particular cybersecurity threat.

Turning first to FIG. 2A, the depicted STIX observables 202 include several elements, including elements 204, 206, 208, 210, 212, 214, 216, 218, 220, 222 and 224.

Element 202 represents a name of an observable portion of a STIX file. The name indicates a beginning of the portion of the STIX file that contains description of the observables associated with a particular cybersecurity threat.

Element 204 represents an observable. Observable 204 is defined by fields called data, a type, a value, and possibly others.

Element 206 represents a type field of observable 204. In the depicted example, type field 206 indicates that observable 204 is an MD5, which identifies a hash function used to produce 128-bit-long hash values.

Element 208 represents a value field of observable 204. In the depicted example, value field 208 includes a hash value that was generated using the MD5 hashing function and that stores a description of observable 204.

Element 210 represents a Boolean operator that concatenates observable 204 and an observable 212.

Element 212 represents an observable. Just like observable 204, observable 212 is defined by fields called data, a type, a value, and possibly others.

Element 214 represents a type field of observable 212. In the depicted example, type field 214 indicates that observable 212 is a destination socket address IP of a device probably targeted by the particular cybersecurity threat.

Element 216 represents a value field of observable 212. In the depicted example, value field 216 includes an alphanumerical string 46.123.99.25, which corresponds to an IP address of the device probably targeted by the particular cybersecurity threat.

Element 218 represents a Boolean operator that concatenates observable 212 and an observable 220.

Element 220 represents an observable. Just like for observables 204, 212, observable 220 is defined by fields called data, type, value, and possibly others.

Element 222 represents a type field of observable 220. In the depicted example, type field 222 indicates that observable 220 is a source socket address IP of a device that probably disseminated the particular cybersecurity threat.

Element 224 represents a value field of observable 220. In the depicted example, value field 224 includes an alphanumerical string 46.123.99.26, which corresponds to an IP address of the device that probably disseminated by the particular cybersecurity threat. Additional elements may also be included.

The example depicted in FIG. 2A shows example observables that were generated for the particular cybersecurity threat that is described in field 208, that was probably directed at the device having the IP address of 46.123.99.25, and that was probably disseminated by the device having the IP address of 46.123.99.26.

FIG. 2B depicts another example of a portion of a STIX expression, and includes elements 252, 254, 256, 258, 260, 262, 264, 266, 268, 270, 272 and 274.

Element 252 represents an observable. Observable 252 is defined by fields called data, a type, a value, and possibly others.

Element 254 represents a type field of observable 252. In the depicted example, type field 254 indicates that observable 252 is a source socket address IP of a device that probably disseminated the particular cybersecurity threat.

Element 256 represents a value field of observable 252. In the depicted example, value field 256 includes an alphanumerical string 46.123.99.26, which corresponds to an IP address of the device that probably disseminated by the particular cybersecurity threat.

Element 258 represents an observable. Observable 258 is defined by fields called data, a type, a value, and possibly others.

Element 260 represents a type field of observable 258. In the depicted example, type field 260 indicates that observable 258 is a source socket address IP of a device that probably disseminated the particular cybersecurity threat.

Element 262 represents a value field of observable 258. In the depicted example, value field 262 includes an alphanumerical string 46.123.99.27, which corresponds to an IP address of the device that probably disseminated by the particular cybersecurity threat.

Element 264 represents an observable. Observable 264 is defined by fields called data, a type, a value, and possibly others.

Element 266 represents a type field of observable 264. In the depicted example, type field 266 indicates that observable 264 is a source socket address IP of a device that probably disseminated the particular cybersecurity threat.

Element 268 represents a value field of observable 264. In the depicted example, value field 268 includes an alphanumerical string 46.123.99.28, which corresponds to an IP address of the device that probably disseminated by the particular cybersecurity threat.

Element 270 represents an observable. Observable 270 is defined by fields called data, a type, a value, and possibly others.

Element 272 represents a type field of observable 270. In the depicted example, type field 272 indicates that observable 270 is a source socket address IP of a device that probably disseminated the particular cybersecurity threat.

Element 274 represents a value field of observable 270. In the depicted example, value field 274 includes an alphanumerical string 46.123.99.29, which corresponds to an IP address of the device that probably disseminated by the particular cybersecurity threat. Additional elements may also be included.

In the depicted example, observables 252, 258, 264, and 270 are separated using Boolean operators. The depicted example shows example observables that were generated for the particular cybersecurity threat that was probably disseminated by the devices having the IP address of 46.123.99.26, 46.123.99.27, 46.123.99.28, and 46.123.99.29.

4.0 Example Graphical Objects Generated for Threat Observables

Each of FIG. 3A, FIG. 3B, FIG. 3C, FIG. 3D, FIG. 3E, and FIG. 3F depicts an example interface for displaying expressions representing information capturing cybersecurity threats according to an example embodiment.

Figure 3A:
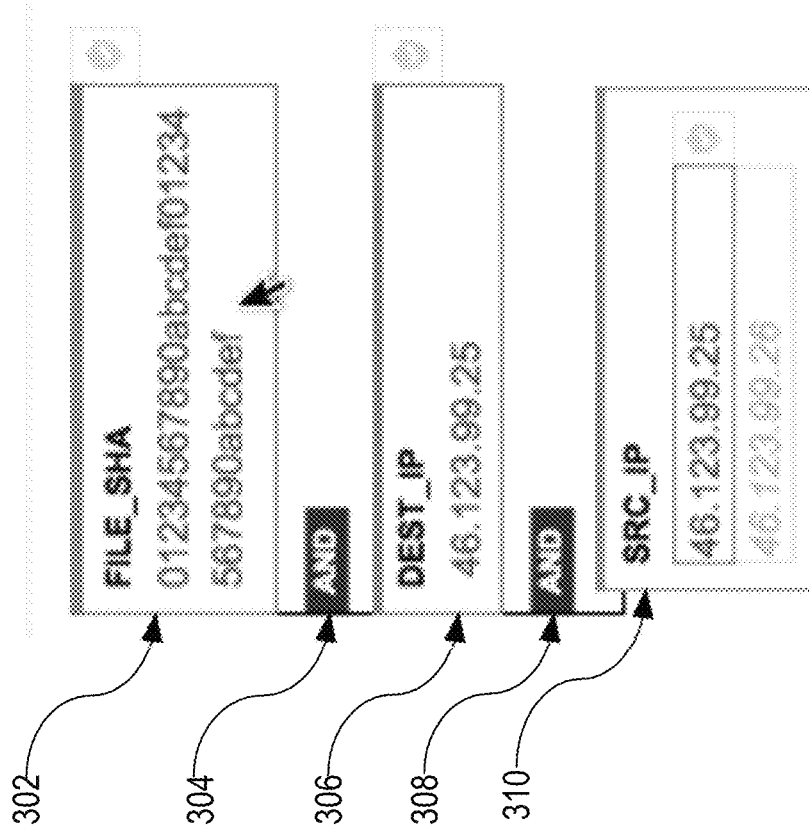

FIG. 3A depicts an example interface generated for the STIX expression depicted in FIG. 2A. The depicted interface includes observation objects 302, 306 and 310, and Boolean graphical objects 304 and 308. Observation object 302 corresponds to observable 204 depicted in FIG. 2A and includes a description corresponding to value 208. Observation object 306 corresponds to observable 212 depicted in FIG. 2A and includes a description corresponding to value 216. Observation object 310 corresponds to observable 220 depicted in FIG. 2A and includes a description corresponding to value 224.

Boolean graphical objects 304 and 308 correspond to operators 210 and 218, respectively, depicted in FIG. 2A.

Additional observation objects and additional Boolean graphical objects may also be included.

The objects depicted in FIG. 3A may be represented using various shapes and colors. For example, the same color may be used to visualize the object of the same type or pertaining to the same observation. The objects may be arranged according to different patterns and different configuration. The patterns and the configuration may be selected and customized to improve the conciseness and efficiency of the displayed objects.

In an embodiment, observation objects and Boolean graphical objects are displayed in the equation visualizer portion of the display. While this is not necessarily required, displaying all the objects generated from the observation in one continuous region, such as the equation visualizer portion of the display, may improve the conciseness and efficiency of the displayed objects.

Figure 3B:
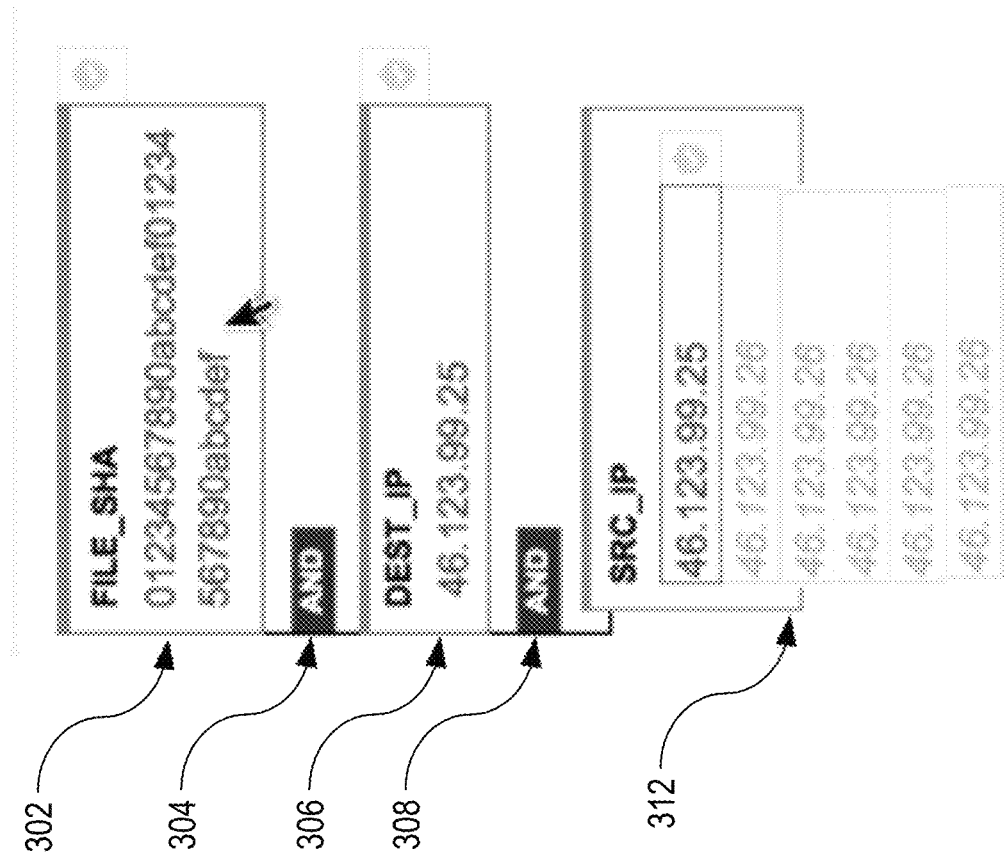

FIG. 3B depicts an example interface generated for the STIX expression depicted in both FIG. 2A and FIG. 2B. The depicted interface includes observation objects 302, 306 and 312, and Boolean graphical objects 304 and 308. Objects 302, 306, 304 and 308 are described in FIG. 2A, and include values 256, 262, 268, and 274 described in FIG. 2B.

Additional observation objects and additional Boolean graphical objects may also be included.

The objects depicted in FIG. 3B may be represented using various shapes and colors. For example, the same color may be used to visualize the object of the same type or pertaining to the same observable. The objects may be arranged according to different patterns and different configuration. The patterns and the configuration may be selected and customized to improve the conciseness and efficiency of the displayed objects.

In an embodiment, observation objects and Boolean graphical objects are displayed in the equation visualizer portion of the display; however, this is necessarily required.

FIG. 3C depicts an example interface generated based on event information obtained for a cybersecurity threat captured using for example, the STIX expression depicted in FIG. 2A. The depicted interface includes an observation object 322 that corresponds to observable 204 of FIG. 2A, an observation object 326 that corresponds to observable 212 of FIG. 2A, and an observation object 330 that corresponds to observable 22 of FIG. 2A.

The example also includes additional information text boxes 324, 328 and 332. The additional information text boxes are used to present additional information that has been retrieved from event logs maintained by firewalls and that is related to the detected cybersecurity threat.

Additional information may be retrieved or otherwise obtained using various methods. For example, cybersecurity threat visualizer 130 of FIG. 1 may retrieve hashed information included in observation object 302 in FIG. 3B generated for a particular observable, use a MD5 function to de-hash the hashed information, and based on the de-hashed information determine one or more events that are described in the particular observable. Then, cybersecurity threat visualizer 130 may access event logs stored in database 115, and scan the event logs to determine whether any event log record in the event logs corresponds or matches the events described in the particular observable. If a match is found and one or more particular log records are determined, then the particular log records are retrieved from the event logs and displayed in additional information text boxes 324, 328 and 332. In the depicted example, an additional information text box 324 includes a date and a time when the threat was detected, and a name of the firewall that detected the threat. An additional information text box 328 includes a date and a time when the threat was received by a destination computer, and a name of the firewall that detected that. An additional information text box 332 includes a date and a time when the threat was probably disseminated from a source computer, and a name of the firewall that detected that. Other additional information may also be displayed in additional text boxes.

Additional observation objects and additional information text boxes may also be included in the interface depicted in FIG. 3C.

In an embodiment, the objects and additional information described in FIG. 3C is displayed in the incident detail visualizer portion of the display; however, that is not necessarily required.

Figure 3D:
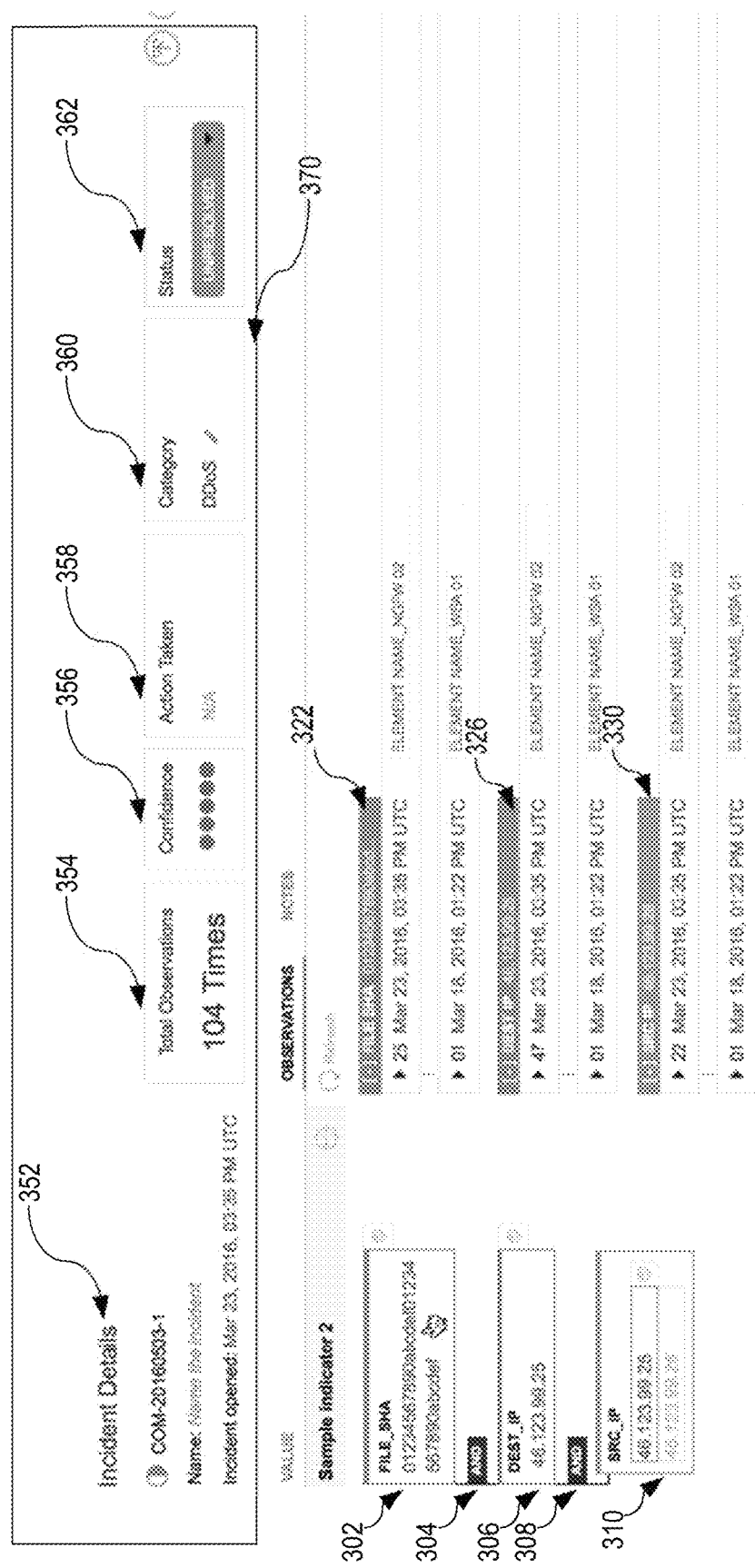

FIG. 3D depicts an example interface that combines visual representations depicted in FIG. 3A and FIG. 3C, and visual representation of additional information obtained by visualizer 130. The depicted example shows observation objects 302, 306 and 310 and Boolean objects 304 and 308, described in FIG. 3A. The example also depicts observation objects 322, 326 and 330 described in FIG. 3C. Furthermore, the example depicts objects displayed in an information banner 370.

In an embodiment, information banner 370 is used to display incident details 352 and statistical information pertaining to the incident. The statistical information may be determined by cybersecurity threat visualizer 130, and may include a count of total observations 354 related to the incident, a confidence level 356 computed for the incident, an indicator 358 of whether any action has been taken with respect to the incident, a category identifier 360 of the incident, and a status indicator 362 with respect of the incident. Other statistical information may also be displayed.

Figure 3E:
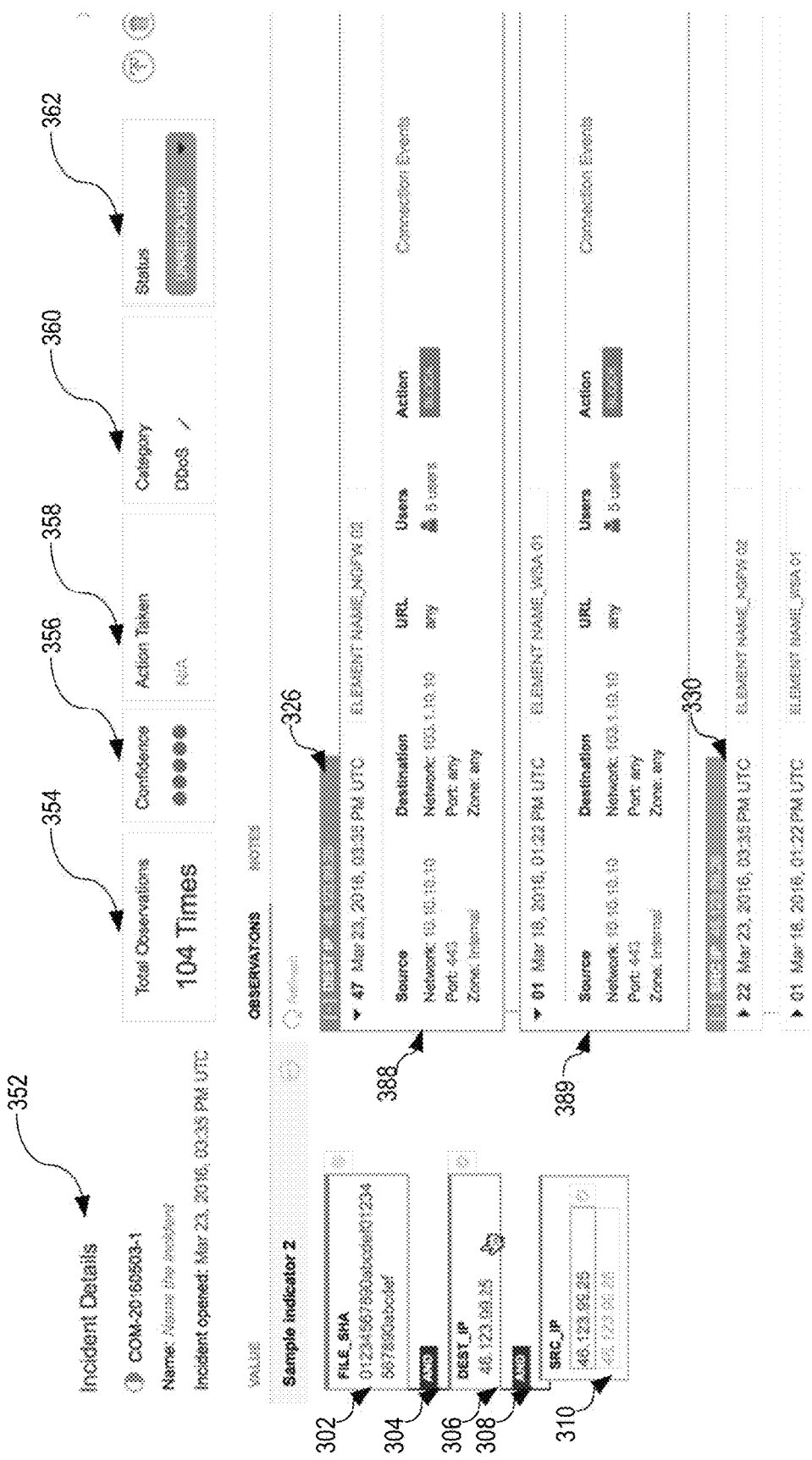
Figure 3F:
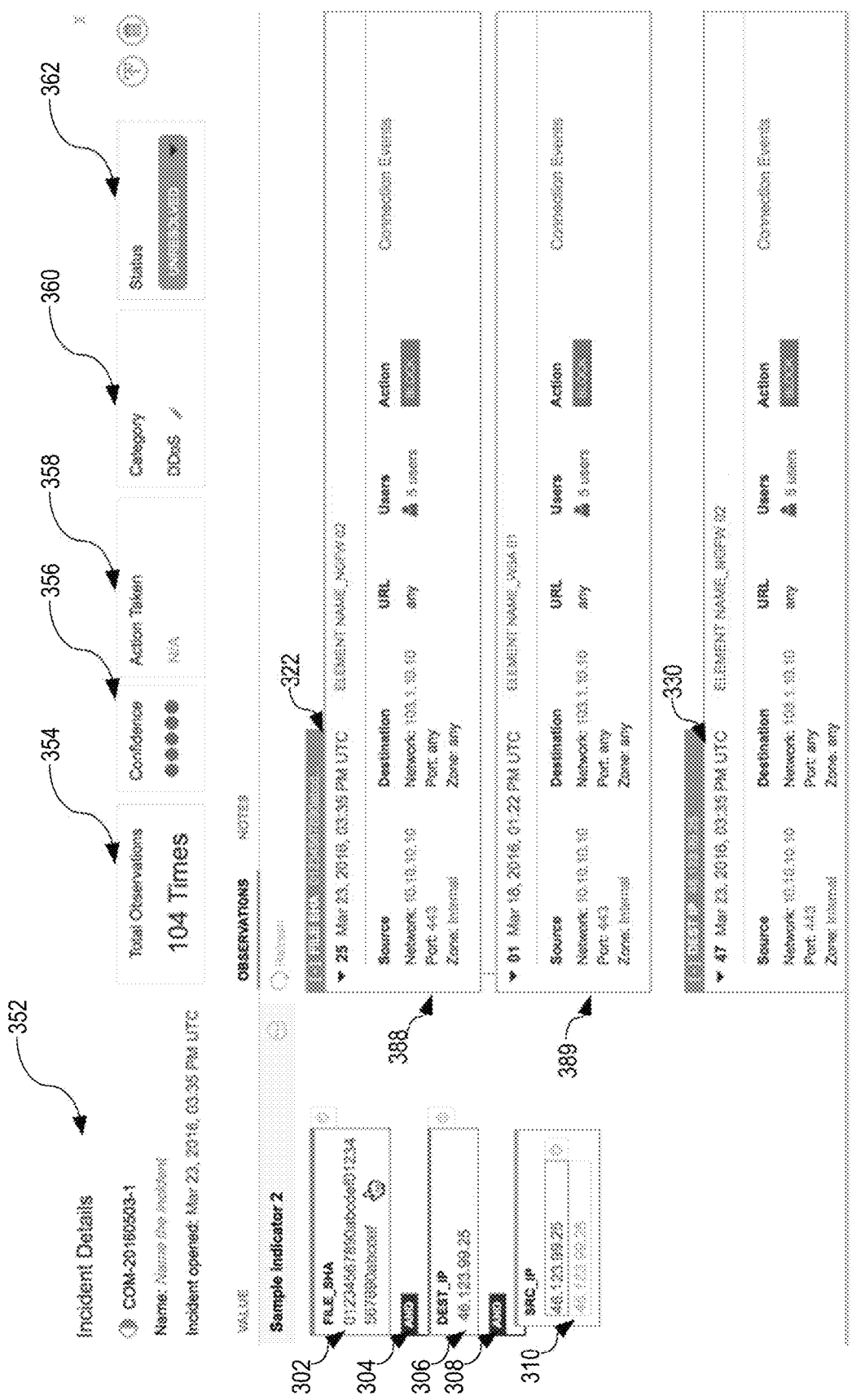

FIG. 3E and FIG. 3F each depict an example interface generated for the STIX expression depicted in FIG. 2A and generated based on event information obtained by visualizer 130. The depicted example includes all elements described in FIG. 3D and a few additional information text boxes, including a text box 388 and a text box 389. The content of boxes 388-389 may be obtained by cybersecurity threat visualizer 130 from event logs in the manner similar to obtaining the contents for boxes 324, 328 and 332 of FIG. 3C. In the depicted example, boxes 388-389 include additional descriptions of the threat sources, the threat destinations, URL addresses, counts of users that most likely have been affected by the threat, and types of actions that have been undertaken.

The objects and boxes described in FIG. 3E may be displayed in the equation visualizer portion of the display and the incident detail visualizer portion of the display, respectively.

Both FIG. 3E and FIG. 3F also illustrate the effect of scrolling contents displayed in the display. In FIG. 3E, observation object 306 that describes a destination IP address has been selected. Therefore, the content of the incident detail visualizer portion of the display has been scrolled in such a way so that the destination IP address information 326 is shown on the top of the incident detail visualizer portion. In contrast, in FIG. 3F, observation object 302 that describes an observation file "File_Sha" 302 has been selected. Therefore, the content of the incident detail visualizer portion of the display has been scrolled in such a way so that the File_Sha information 322 is shown on the top of the incident detail visualizer portion.

Figure 4A:
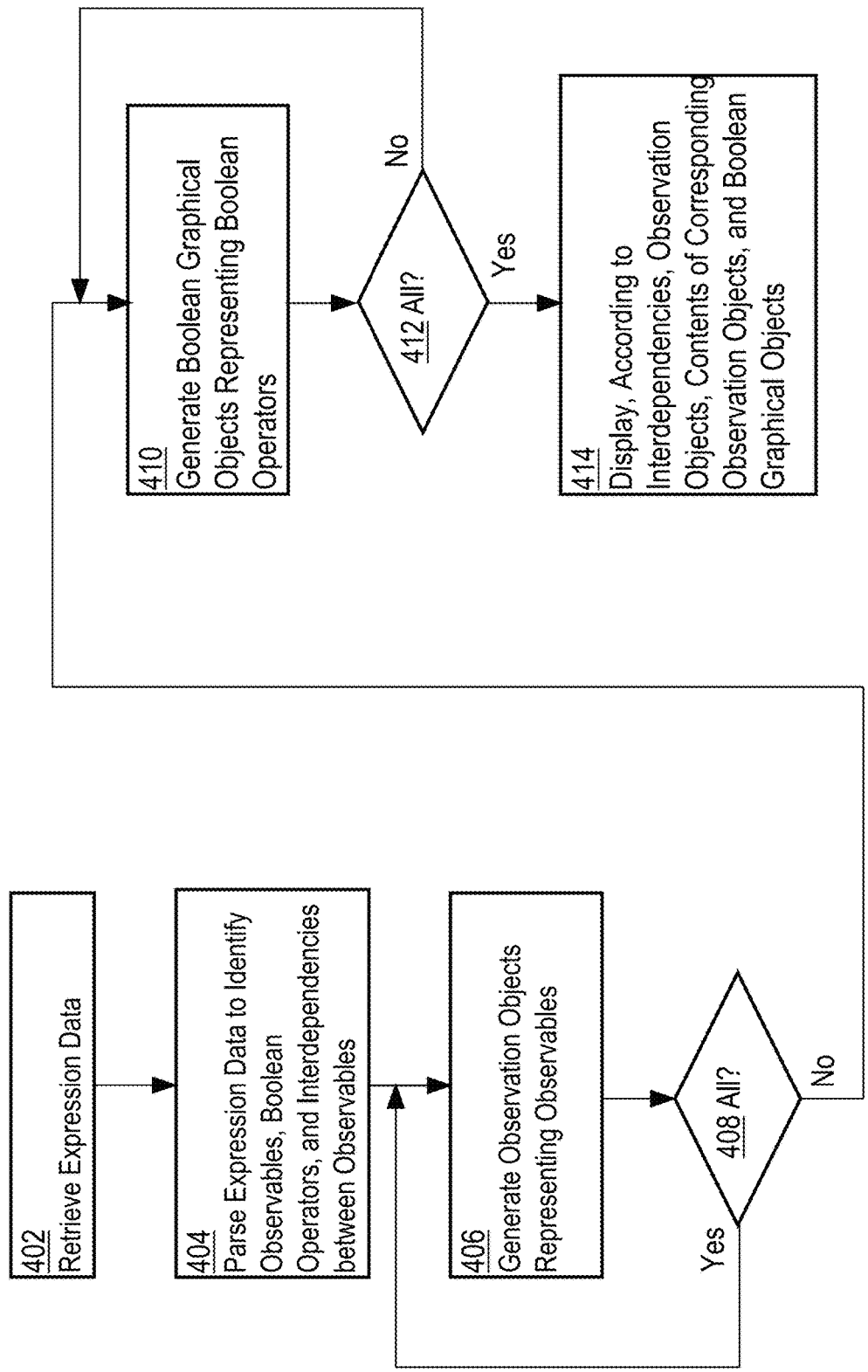
FIG. 4A and FIG. 4B illustrate a process for generating and updating an interface that depicts expressions representing information capturing cybersecurity threats according to an example embodiment.
Figure 4B:
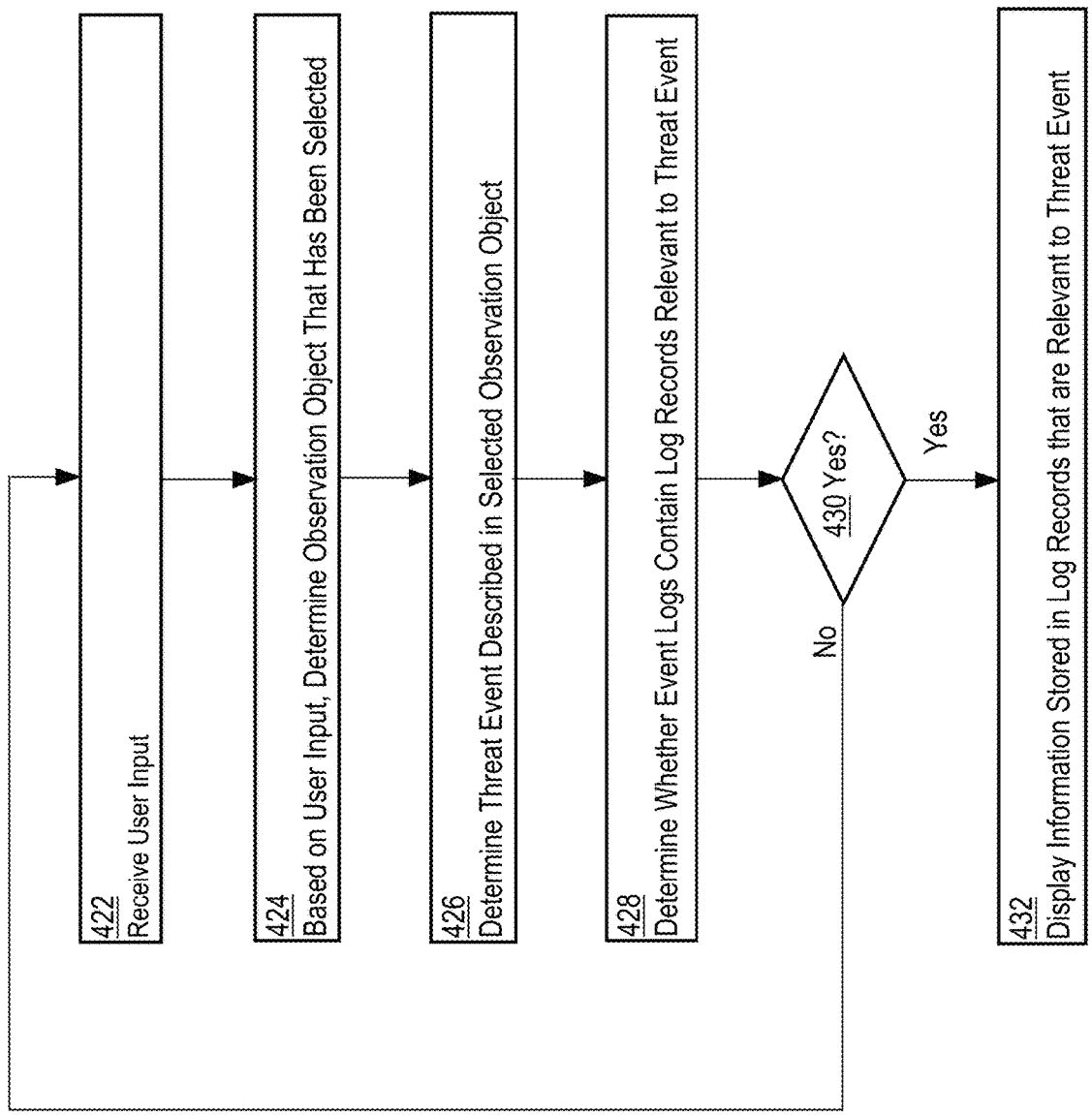
Figure 5:
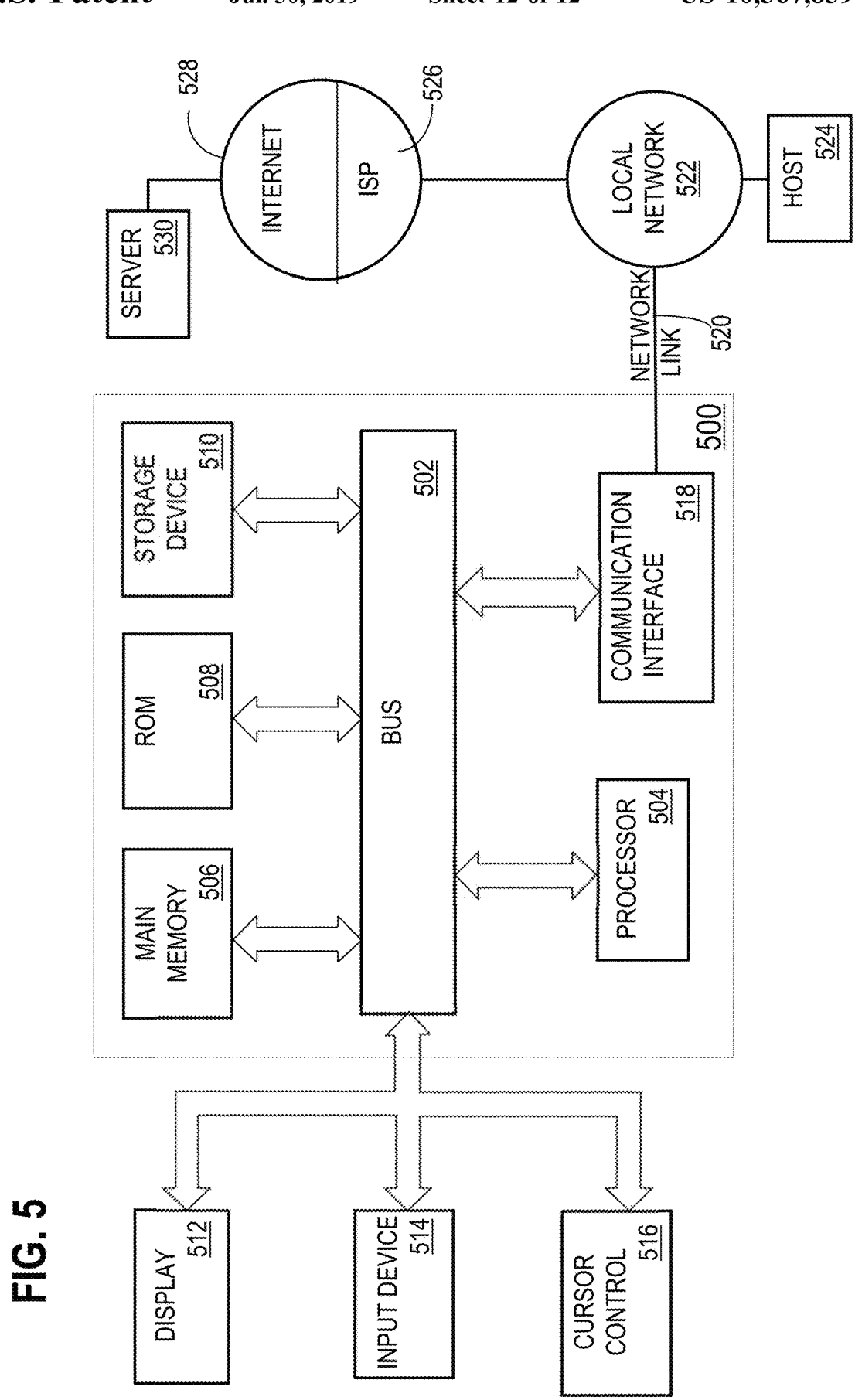
FIG. 5 is a block diagram that depicts a computer system upon which an embodiment of the approach may be implemented.

5.0 Example Process for Visualizing Expressions Representing Cybersecurity Threat Information FIG. 4A and FIG. 4B each illustrates a process for generating and updating an interface that depict expressions representing information capturing cybersecurity threats according to an example embodiment. Specifically, FIG. 4A depicts a process for generating and displaying objects created for observables defined in a received STIX file, while FIG. 4B depicts a process of enhancing the display of the generated objects and a process of handing interactivity with the display.

Turning first to FIG. 4A, in step 402, a firewall computer, such as firewall device 120A/N of FIG. 1, retrieves expression data from storage. The expression data may include a STIX file that may include one or more STIX expressions. Examples of expressions are described in FIG. 2A and FIG. 2B. The expressions may describe one or more threats detected in one or more computer networks by security intelligence sources 110.

In step 404, the firewall computer parses the received expression data to identify observables, Boolean operators and interdependencies between the observables. The parsing process may be performed by expression parser 134 as described in FIG. 1. Examples of observables, Boolean operators and interdependencies are described in FIG. 2A and FIG. 2B.

In step 406, the firewall computer generates observation objects representing the observable identified in step 404. Usually, for each observable, at least one observation object is generated. An observation object may be instantiated, and an instance may include a name of the observable object, a description, a type, a value and data. The observation object generation may be performed by object generator 136 and is described in detail in FIG. 1.

In step 408, the firewall computer tests whether all observation objects have been generated for all observable identified in the received expression data. For example, a test may be performed to determine whether for each observable identified in the expression data at least one observation object has been generated. The test may be performed by object generator 136 and is described in detail in FIG. 1. If all necessary observation objects have been generated, then step 410 is performed. Otherwise, step 406 is repeated.

In step 410, the firewall computer generates Boolean graphic objects representing the Boolean operators identified in step 404. Usually, for each Boolean operator, exactly one Boolean graphic object is generated. A Boolean graphic object may be instantiated, and an instance may include a name of the Boolean graphic object, and optionally some data. Generation of the Boolean graphic objects may be performed by object generator 136 and is described in detail in FIG. 1.

In step 412, the firewall computer tests whether all Boolean graphic objects have been generated for all Boolean operators identified in the received expression data. For example, a test may be performed to determine whether for each Boolean operator identified in the expression data exactly one Boolean graphic object has been generated. The test may be performed by object generator 136 and is described in detail in FIG. 1. If all necessary Boolean graphic objects have been generated, then step 414 is performed. Otherwise, step 410 is repeated.

In step 414, the firewall computer generates a graphical representation of the generated observation objects and Boolean graphic objects, and displays the graphical representation in the display according to the interdependencies identified in the parsed expression data. For example, if the expression data includes two observables concatenated using an AND operators, then the firewall computer generates two observation objects corresponding to the observables, generates one Boolean graphic objects corresponding to the AND operator, and displays both observation objects connected using the Boolean graphic object. The graphical representation may be color coded and modified according to system and user preferences. The process of generating the graphical representation may be performed by controller 140 and is described in detail in FIG. 1. The process of displaying the graphical representation of the objects and interrelations may be performed by presenter 142 and is described in detail in FIG. 1.

Also in step 414, additional information may be displayed in for example, the information banner portion of the display. The additional information may be collected or obtained by controller 140 and presented in the display by presenter 142 described in FIG. 1.

FIG. 4B depicts a process of enhancing the display of the already generated and displayed objects, and a process of handing interactivity with the display.

In step 422, a firewall computer, such as firewall device 120A/N of FIG. 1, receives user input. The user input may be received by input hander 138 described in FIG. 1. The user input may be a selection of an already displayed observation object, or a selection of a scroll functionality, or any other type of input call that input hander 138 is configured to handle. The selection may be performed using any type of input device such as a mouse, a pen, or a keystroke. The selection may also be performed using a finger if the display is implemented as a touch screen. For the clarity of the description, it is assumed herein that the user input is a selection of one of the observation objects already displayed in the display.

In step 424, based on the user input, the firewall computer determines an observation object that has been selected. This may be determined by input handler 138. Determining the selected observation object may be performed using any method known in the art. For example, input handler 138 may test the status of input devices, determine a location on the display to which a particular input device is pointing, and identify the observation object that is displayed at the determined location on the display.

In step 426, the firewall computer determines a threat event described in the selected observation object. This may include determining a hash function used to hash a description of the cybersecurity threat included in the selected observation object and therefore included in a corresponding observable. The hash function may be used to de-hash the description, and the resulting de-hashed description may be analyzed to determine for example, an identifier of the threat event. Other methods for identifying the threat event may also be employed here.

In step 428, the firewall computer accesses one or more event logs stored in database 115, and scans the event log records stored in the logs to determine whether the logs contain any additional information that is relevant or related to the threat event. For example, controller 140 of visualizer 130 may access the event logs, scan the logs and try to determine whether the logs include any records that have timestamps corresponding to a timestamp associated with the threat event, or whether the logs include any records that have a threat event identifier corresponding to the threat event identifier determined for the selected observation object.

In step 430, the firewall computer tests whether at least one event log record that is relevant to the threat event has been identified. The test may be performed by controller 140 and is described in detail in FIG. 1. If at least one relevant event log record has been found, then step 432 is performed. Otherwise, step 422 is performed if new input is received.

In step 432, a firewall computer retrieves the relevant event log records from the event logs. This may be performed by controller 140. The retrieved event log records may be transmitted to presenter 142, which may display the retrieved event log records in the display. The retrieved event log records are considered additional information about the threat event, and therefore they may be displayed in the incident detail visualizer portion of the display.

The additional information may be updated as new event records become available, or when a request for additional information is received. The additional information may also be updated when a request to scroll the displayed contents is received. The details about scrolling the displayed contents are described in FIG. 3E and FIG. 3F.

6.0 Benefits of Embodiments

One benefit of embodiments of a visualizer as described herein is the ability to provide a concise, efficient graphical interface for visualizing all types of expressions that encapsulate information about cybersecurity threats. The interface provides an accurate, concise, efficient, clear, machine-generated graphical visualization of the threats even if the threats are originally expressed using complex and multi-level expressions.

The visualizer may be configured to process and visualize different types of expressions, including expressions encoded in STIX files. Even though STIX files and indicators may be difficult to understand when hierarchical and multi-level structures are used, visual representations generated by the visualizer from STIX files as described herein can be concise and efficiently transmitted or displayed.

Another benefit of an embodiment of a visualizer is interactivity. Any object that is visualized may be selected via computer input, and upon the selection, additional information related to the object, or related to the corresponding observable, may be obtained and displayed on a display. The additional information may be obtained from event logs and/or various data repositories that are available to the visualizer.

7.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates a computer system 600 upon which an embodiment of the approach may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main-memory 606. Such instructions may be read into main-memory 606 from another storage medium, such as storage device 610. Execution of the sequences of instructions contained in main-memory 606 causes processor 604 to perform the process steps described herein. In alternative embodiments, hardwired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main-memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main-memory 606, from which processor 604 retrieves and executes the instructions. The instructions received by main-memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server computer 630 might transmit a requested code for an application program through Internet 628, ISP 626, local network 622 and communication interface 618.

The received code may be executed by processor 604 as it is received, and/or stored in storage device 610, or other non-volatile storage for later execution.

7.0 Other Aspects of Disclosure

In the foregoing specification, embodiments of the approach have been described with reference to numerous specific details that may vary from implementation to implementation. The specification and drawings are, accordingly, to be regarded in an illustrative rather than a restrictive sense. The sole and exclusive indicator of the scope of the approach, and what is intended by the applicants to be the scope of the approach, is the literal and equivalent scope of the set of claims that issue from this application, in the specific form in which such claims issue, including any subsequent correction.

What is claimed is:

1. A computer system for visualizing cybersecurity threat information provided by a computer network with a plurality of computing devices, the computer system comprising:
   a display;
   one or more processors coupled to the display;
   one or more non-transitory computer-readable storage media coupled to the one or more processors and storing data that represents one or more expressions and one or more sequences of instructions which when executed by the one or more processors causes the one or more processors to:
   retrieve, from the storage media, the data that represents an expression comprising a plurality of observables;
   parse the data that represents the expression to identify the plurality of observables, one or more Boolean operators, and one or more interdependencies between observables of the plurality of observables; wherein an interdependency, of the one or more interdependencies, determines a logical relationship between two observables, of the plurality of observables, that are concatenated using a Boolean operator of the one or more Boolean operators;
   generate a plurality of observation objects that corresponds to the plurality of observables; wherein an observation object of the plurality of observation objects corresponds to a respective observable of the plurality of observables, and stores information included in the respective observable;
   generate one or more Boolean graphical objects that correspond to the one or more Boolean operators; wherein two observation objects, of the plurality of observation objects, are to be concatenated using a Boolean graphical object, of the one or more Boolean graphical objects, that corresponds to a Boolean operator that concatenates respective two observables of the plurality of observables;
   cause to present, in an expression visualizer portion of the display, the plurality of observation objects, contents included in the plurality of observations objects, and the one or more Boolean graphical objects connecting observation objects of the plurality of observation objects to represent the interdependencies determined for the plurality of observables.

2. The computer system of claim 1, wherein an observable, of the plurality of observables, comprises at least one type indicator and at least one value; wherein a type indicator indicates a type of a value included in the observable.

3. The computer system of claim 2, wherein the one or more processors execute additional instructions which cause the one or more processors to:
receive first input indicating a selection of a first observation object, of the plurality of observation objects, which corresponds to a first observable of the plurality of observables;
in response to receiving the first input indicating the selection of the first observation object of the plurality of observation objects, determine a first type indicator and a first value associated with the first observable; and based on the first type indicator and the first value, determine a first event encoded in the first observable.

4. The computer system of claim 3, wherein the one or more processors execute additional instructions which cause the one or more processors to:
retrieve an event log that stores a plurality of log records containing information about data traffic transmitted to and from one or more firewall devices;
determine whether the first event matches a particular log record, of the plurality of log records;
in response to determining that the first event matches the particular log record, extract information from the particular log record, and cause to present, in an incident detail portion of the display, the information extracted from the particular log record that matches the first event.

5. The computer system of claim 4, wherein the one or more processors execute additional instructions which cause the one or more processors to:
receive second input indicating a request to scroll information displayed in the incident detail portion of the display;
in response to receiving the second input indicating the request to scroll the information displayed in the incident detail portion of the display, cause to present, in the incident detail portion of the display, scrolled information obtained by scrolling the information according to the second input.

6. The computer system of claim 5, wherein a particular log record includes one or more of: a date of an event, a time of the event, a firewall identifier of a firewall on which the event occurred, a network identifier of a network in which the event occurred, a port identifier of a port on which the event occurred, or a count of users who were impacted by the event.

7. The computer system of claim 6, wherein the one or more processors execute additional instructions which cause the one or more processors to:
determine additional information associated with the particular event; wherein the additional information includes one or more of: a count of observations, a confidence level, an action, or an event category, or a threat status;
cause to present, in an information banner of the display, the additional information associated with the particular event.

8. A method for visualizing cybersecurity threat information provided by a computer network with a plurality of computing devices, the method comprising:
retrieving, from memory, data that represents an expression comprising a plurality of observables;
parsing the data that represents the expression to identify the plurality of observables, one or more Boolean operators, and one or more interdependencies between observables of the plurality of observables; wherein an interdependency, of the one or more interdependencies, determines a logical relationship between two observables, of the plurality of observables, that are concatenated using a Boolean operator of the one or more Boolean operators;
generating a plurality of observation objects that corresponds to the plurality of observables; wherein an observation object of the plurality of observation objects corresponds to a respective observable of the plurality of observables, and stores information included in the respective observable;
generating one or more Boolean graphical objects that correspond to the one or more Boolean operators; wherein two observation objects, of the plurality of observation objects, are to be concatenated using a Boolean graphical object, of the one or more Boolean graphical objects, that corresponds to a Boolean operator that concatenates respective two observables of the plurality of observables;
causing to present, in an expression visualizer portion of a display, the plurality of observation objects, contents included in the plurality of observations objects, and the one or more Boolean graphical objects connecting observation objects of the plurality of observation objects to represent the interdependencies determined for the plurality of observables.

9. The method of claim 8, wherein an observable, of the plurality of observables, comprises at least one type indicator and at least one value; wherein a type indicator indicates a type of a value included in the observable.

10. The method of claim 9, further comprising:
receiving first input indicating a selection of a first observation object, of the plurality of observation objects, which corresponds to a first observable of the plurality of observables;
in response to receiving the first input indicating the selection of the first observation object of the plurality of observation objects, determining a first type indicator and a first value associated with the first observable; and based on the first type indicator and the first value, determine a first event encoded in the first observable.

11. The method of claim 10, further comprising:
retrieving an event log that stores a plurality of log records containing information about data traffic transmitted to and from one or more firewall devices;
determining whether the first event matches a particular log record, of the plurality of log records;
in response to determining that the first event matches the particular log record, extract information from the particular log record, and causing to present, in an incident detail portion of the display, the information extracted from the particular log record that matches the first event.

12. The method of claim 11, further comprising:
receiving second input indicating a request to scroll information displayed in the incident detail portion of the display;

in response to receiving the second input indicating the request to scroll the information displayed in the incident detail portion of the display, causing to present, in the incident detail portion of the display, scrolled information obtained by scrolling the information according to the second input.

13. The method of claim 12, wherein a particular log record includes one or more of: a date of an event, a time of the event, a firewall identifier of a firewall on which the event occurred, a network identifier of a network in which the event occurred, a port identifier of a port on which the event occurred, or a count of users who were impacted by the event.

14. The method of claim 13, further comprising:
determining additional information associated with the particular event; wherein the additional information includes one or more of: a count of observations, a confidence level, an action, or an event category, or a threat status;
causing to present, in an information banner of the display, the additional information associated with the particular event.

15. A non-transitory computer-readable storage medium storing one or more instructions which, when executed by one or more hardware processors, cause the one or more hardware processor to perform:
retrieving, from memory, data that represents an expression comprising a plurality of observables;
parsing the data that represents the expression to identify the plurality of observables, one or more Boolean operators, and one or more interdependencies between observables of the plurality of observables; wherein an interdependency, of the one or more interdependencies, determines a logical relationship between two observables, of the plurality of observables, that are concatenated using a Boolean operator of the one or more Boolean operators;
generating a plurality of observation objects that corresponds to the plurality of observables; wherein an observation object of the plurality of observation objects corresponds to a respective observable of the plurality of observables, and stores information included in the respective observable;
generating one or more Boolean graphical objects that correspond to the one or more Boolean operators; wherein two observation objects, of the plurality of observation objects, are to be concatenated using a Boolean graphical object, of the one or more Boolean graphical objects, that corresponds to a Boolean operator that concatenates respective two observables of the plurality of observables;
causing to present, in an expression visualizer portion of a display, the plurality of observation objects, contents included in the plurality of observations objects, and the one or more Boolean graphical objects connecting observation objects of the plurality of observation objects to represent the interdependencies determined for the plurality of observables.

16. The non-transitory computer-readable storage medium of claim 15, wherein an observable, of the plurality of observables, comprises at least one type indicator and at least one value; wherein a type indicator indicates a type of a value included in the observable.

17. The non-transitory computer-readable storage medium of claim 16, storing additional instructions for:
receiving first input indicating a selection of a first observation object, of the plurality of observation objects, which corresponds to a first observable of the plurality of observables;
in response to receiving the first input indicating the selection of the first observation object of the plurality of observation objects, determining a first type indicator and a first value associated with the first observable; and based on the first type indicator and the first value, determine a first event encoded in the first observable.

18. The non-transitory computer-readable storage medium of claim 17, storing additional instructions for:
retrieving an event log that stores a plurality of log records containing information about data traffic transmitted to and from one or more firewall devices;
determining whether the first event matches a particular log record, of the plurality of log records;
in response to determining that the first event matches the particular log record, extract information from the particular log record, and causing to present, in an incident detail portion of the display, the information extracted from the particular log record that matches the first event.

19. The non-transitory computer-readable storage medium of claim 18, storing additional instructions for:
receiving second input indicating a request to scroll information displayed in the incident detail portion of the display;
in response to receiving the second input indicating the request to scroll the information displayed in the incident detail portion of the display, causing to present, in the incident detail portion of the display, scrolled information obtained by scrolling the information according to the second input.

20. The non-transitory computer-readable storage medium of claim 19, wherein a particular log record includes one or more of: a date of an event, a time of the event, a firewall identifier of a firewall on which the event occurred, a network identifier of a network in which the event occurred, a port identifier of a port on which the event occurred, or a count of users who were impacted by the event.

* * * * *